No. 689,182. Patented Dec. 17, 1901.
Z. T. HALL.
BREAD OR OTHER TOASTER.
(Application filed Mar. 20, 1901.)
(No Model.)
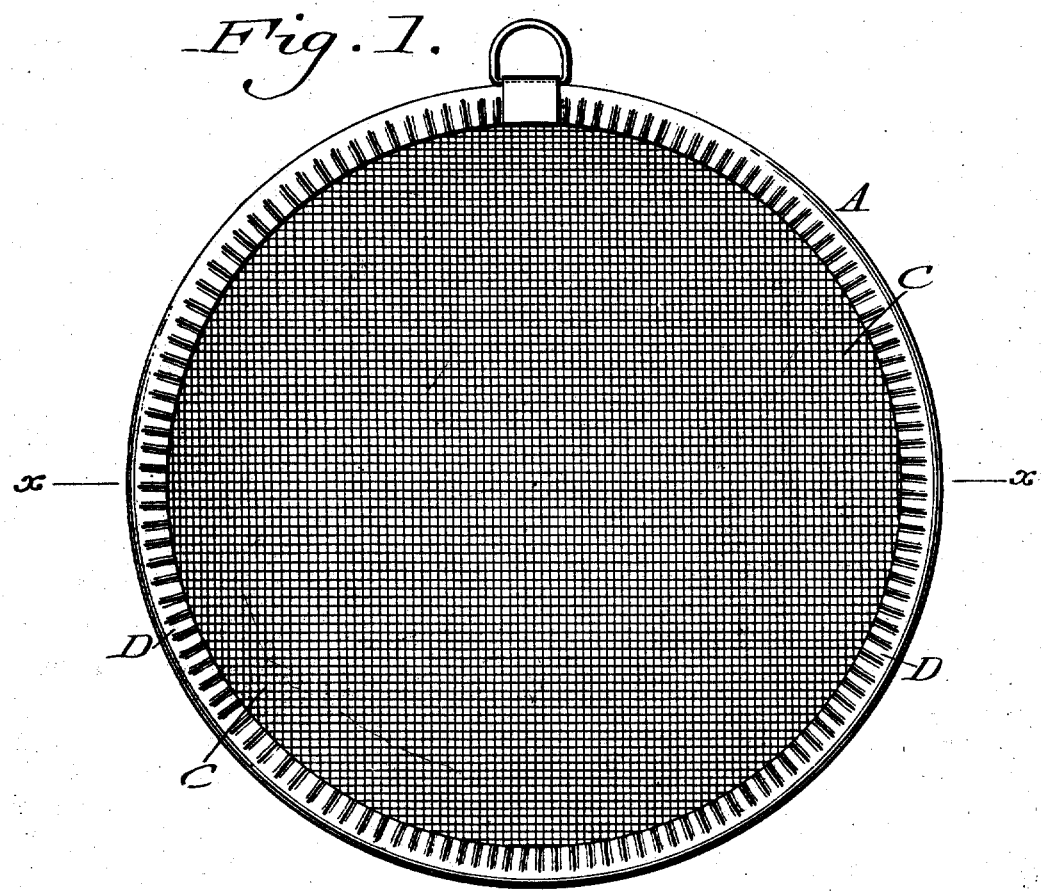
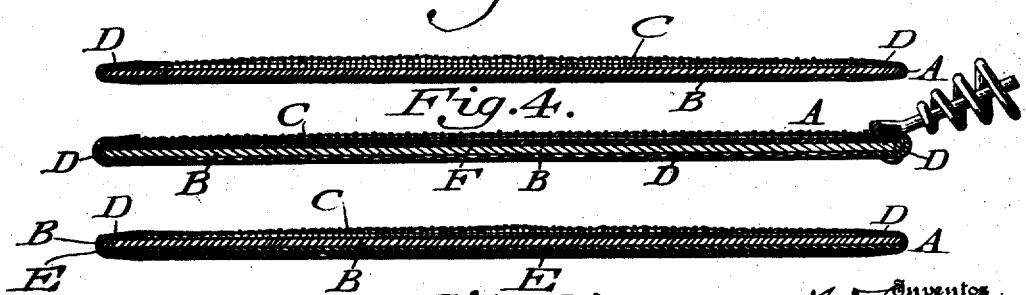

UNITED STATES PATENT OFFICE.

ZACHARY T. HALL, OF PHILADELPHIA, PENNSYLVANIA.

BREAD OR OTHER TOASTER.

SPECIFICATION forming part of Letters Patent No. 689,182, dated December 17, 1901.

Application filed March 20, 1901. Serial No. 52,117. (No model.)

*To all whom it may concern:*

Be it known that I, ZACHARY T. HALL, a citizen of the United States, residing in the city and county of Philadelphia, State of Pennsylvania, have invented a new and useful Improvement in Bread or other Toasters, of which the following is a specification.

My invention consists of a bread or other toaster formed of a mat of fireproof material and a perforated facing, the latter being raised above the surface of the former, thus preventing the bread, &c., from being scorched or burned.

It also consists of a metallic plate interposed between the mat and facing for effectively conveying the heat from the mat to the bread, &c., to be toasted.

Figure 1 represents a face view of a toaster embodying my invention. Fig. 2 represents a diametrical section thereof. Fig. 3 represents a diametrical section of a toaster having a supplemental heating-plate and guard for the mat on the under side thereof. Fig. 4 represents a section of a portion of another form of my invention.

Similar letters of reference indicate corresponding parts in the figures.

Referring to the drawings, A designates a toaster, the same being formed of a mat B, of asbestos or other fireproof material, and a facing C, of metallic gauze, on the top thereof, said parts being connected by the peripheral rim D. The facing C is somewhat convex, whereby it is raised above the surface of the mat and removed in the main from contact with the same.

E designates the bottom proper, which consists of a plate of sheet-steel or other metal placed on the under side of the mat and secured thereto by the rim D.

The operation is as follows: The device is placed upon a stove, range, &c., and the heat is transmitted to the facing, it also passing through the meshes thereof, by which provision the bread, &c., will be toasted in an effective and uniform manner, and as the facing is raised from the mat the bread, &c., is removed from direct contact with said mat and so prevented from being burned or scorched, especially as the mat becomes heated to a high degree. As the mat is of a non-combustible nature, it remains intact and is comparatively indestructible. The plate E when in use will become highly heated and so transmit its heat to the mat, while the latter will be guarded from being soiled from below by being removed from direct contact with the stove, &c.

In Fig. 4 I show a toaster as having a plate F, of sheet-steel or other metal, interposed between the asbestos mat B and the wire facing C, so as to increase the heat imparted to said facing.

As the asbestos mat is liable to become tainted if contacting with the stove-plate or fuel and so affect the facing C and the food thereon, the plate F in Fig. 4 is interposed between the mat and facing and so prevents the tainting of the mat from being imparted to the food, while in Fig. 3 the plate E is placed below the mat and removes the latter from contact with the stove-plates or fuel, said plate thus primarily receiving the heat and not being liable to be tainted.

Having thus described my invention, what I claim as new, and desire to secure by Letters Patent, is—

1. A toaster formed of a fireproof mat, an open-work facing, and means for connecting said parts, said facing being raised above the surface of said mat.

2. A toaster formed of a fireproof mat, a facing of wire-gauze, and a plate of metal interposed between said mat and facing, said mat, facing and plate being connected at their periphery by suitable means.

ZACHARY T. HALL.

Witnesses:
JOHN A. WIEDERSHEIM,
C. D. McVAY.